United States Patent [19]
Kawanishi

[11] Patent Number: 5,886,438
[45] Date of Patent: Mar. 23, 1999

[54] STEPPING MOTOR HAVING BOBBIN STRUCTURE MATERIALLY INTEGRALLY FORMED WITH A BEARING AND A POSITIONING PORTION

[75] Inventor: Toshiaki Kawanishi, Yokohama, Japan

[73] Assignee: Canon Kabushiki Kaisha, Tokyo, Japan

[21] Appl. No.: 774,882

[22] Filed: Dec. 27, 1996

[30] Foreign Application Priority Data

Jan. 8, 1996 [JP] Japan .................................. 8-018183

[51] Int. Cl.$^6$ ........................... H02K 37/00; H02K 5/16; F16C 19/10
[52] U.S. Cl. ................... 310/90; 310/40 MM; 310/49 R; 310/43; 310/194; 310/254; 384/610; 384/420
[58] Field of Search ................ 310/90, 40 MM, 310/89, 49 R, 43, 162, 164, 254; 384/610, 420; 360/106, 109; 74/89.15

[56] References Cited

U.S. PATENT DOCUMENTS

| | | |
|---|---|---|
| 4,107,559 | 8/1978 | Patel ....................................... 310/49 R |
| 4,352,036 | 9/1982 | Kuwako ..................................... 310/83 |
| 4,700,251 | 10/1987 | Fuke et al. ............................... 360/106 |
| 4,841,193 | 6/1989 | Matsushita et al. ..................... 310/257 |
| 5,298,822 | 3/1994 | Bosman et al. ......................... 310/49 R |
| 5,465,020 | 11/1995 | Peterson ................................. 310/194 |
| 5,486,054 | 1/1996 | Nagata et al. .......................... 384/610 |

*Primary Examiner*—Clayton LaBalle
*Assistant Examiner*—Tran N Nguyen
*Attorney, Agent, or Firm*—Fitzpatrick, Cella, Harper & Scinto

[57] ABSTRACT

According to this invention, in a stepping motor in which bearings are disposed at two end portions of a motor shaft which is coaxially fixed to a magnet rotor, one bearing of the motor shaft arranged in a motor case, a bobbin serving as a coil frame, and the positioning portion of the motor holder are integrally formed of a resin. In addition, two projecting pieces that protrude outward are formed on the bearing on the motor holder side of the stepping motor. A projecting portion is formed on each projecting piece. A positioning rotation regulating hole which is fitted on the projecting portion to regulate rotation and an opening for passing the projecting piece are provided to the bearing support portion of the motor holder.

4 Claims, 3 Drawing Sheets

STEPPING MOTOR HAVING BOBBIN STRUCTURE MATERIALLY INTEGRALLY FORMED WITH A BEARING AND A POSITIONING PORTION

BACKGROUND OF THE INVENTION

1. Field of the Invention

The present invention relates to a stepping motor suitable for driving the photographing lens of a single-lens reflex camera or a video camera and a method of manufacturing the motor.

2. Related Background Art

Conventionally, a two-phase PM type stepping motor as shown in FIG. 1 is used as a stepping motor for driving the photographing lens of a single-lens reflex camera or a video camera. Referring to FIG. 1, a motor shaft 1 is rotatably positioned by an intermediate bearing (normally, a sintered oil-impregnated alloy bearing) 3 and a distal end bearing 4 both of which are pressed into a motor holder 2. A thrust spring 5 suppresses any play of the motor shaft along the thrust direction and applies an appropriate pilot pressure to the motor shaft. A cylindrical magnet rotor 6 is fixed to the motor shaft 1 by bonding, and the outer surface of the magnet rotor 6 is magnetized to have multiple poles.

A stator 7 comprises two electromagnets each of which has pole teeth corresponding to the number of poles of the magnet rotor and is constituted by coils 11 as solenoids wound on a bobbin 10 to form a magnetic path together with a motor case 9 which is coupled to the motor holder with screws 8. The pole teeth of the electromagnets are shifted by a ½ pitch. More specifically, when rectangular waves or sine waves that are 90° out of phase are supplied to the coils, the magnet rotor 6 rotates. A nut or rack (not shown) meshed with a screw portion 1a of the motor shaft 1 can be used to move a lens.

In this conventional stepping motor, when the motor shaft 1 is to be inserted in the intermediate bearing 3 of the holder 2, the screw portion 1a of the motor shaft 1 may be damaged, and the resultant motor characteristics may be degraded. In addition, a post-process is required to match the screw diameter of the screw portion 1a of each of the mass-produced motor shafts 1 with the diameter of the intermediate bearing 3. Furthermore, a large number of parts are used to result in an increase in cost.

SUMMARY OF THE INVENTION

The present invention has been made to solve the above problems, and has as its object to provide a stepping motor having a rear bearing structure which guarantees easy and accurate positioning between a motor holder and a motor shaft center.

It is another object of the present invention to integrally form a rear bearing, a coil bobbin, and the positioning portion of a motor holder.

It is still another object of the present invention to form two opposite opening portions in a motor holder such that one of the opening portions has a size that can pass the magnet rotor of a motor shaft therethrough.

Other objects of the present invention will become apparent from the embodiments to be described below.

DESCRIPTION OF THE PREFERRED EMBODIMENTS

An embodiment of the present invention will be described below with reference to the accompanying drawings.

Figure 1:
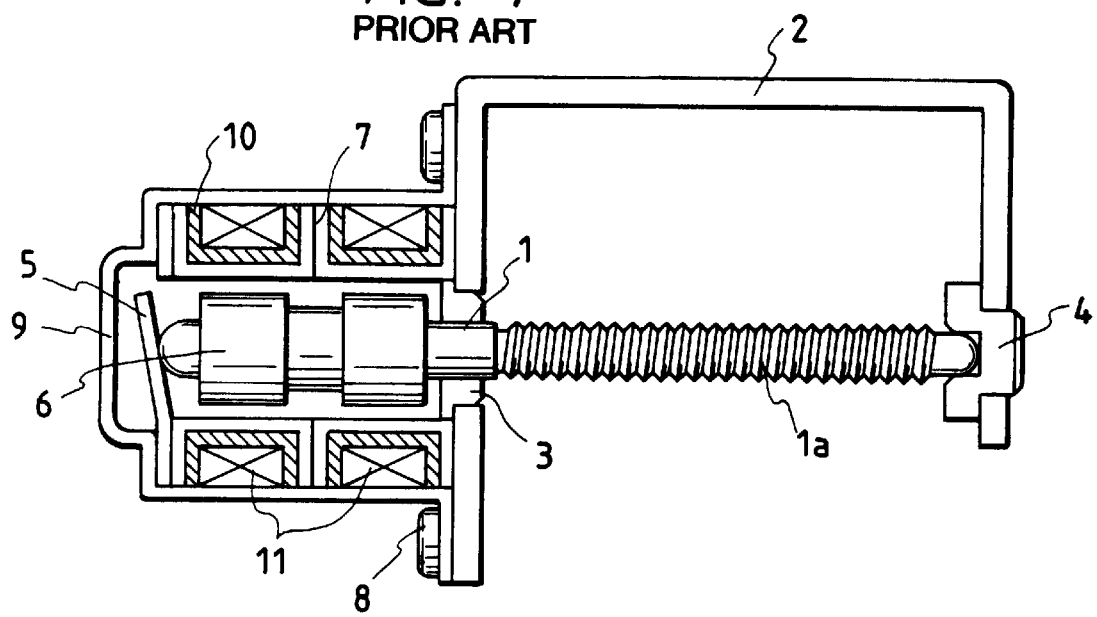
FIG. 1 is a sectional view showing a conventional stepping motor.
Figure 2:
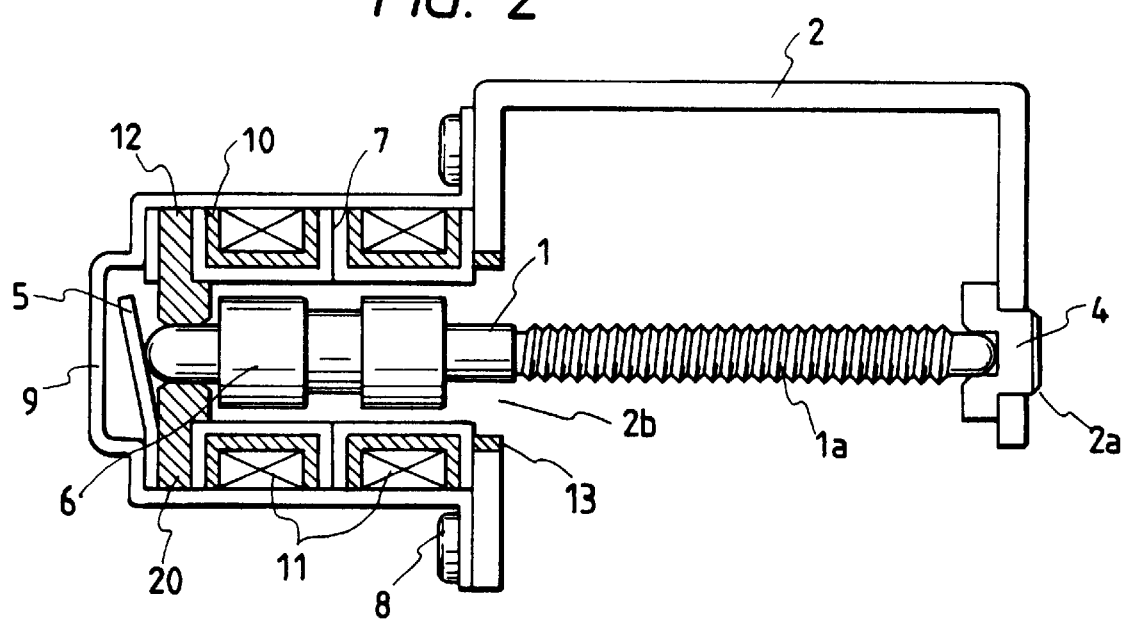
FIG. 2 is a sectional view showing a stepping motor according to an embodiment of the present invention.

FIG. 2 is a sectional view showing a stepping motor. Referring to FIG. 2, the stepping motor has a motor shaft 1 and a motor holder 2. The motor holder 2 is formed to have opposite pieces. A first opening 2a for receiving a distal end bearing portion 4 is formed on one piece side. A second opening 2b having a size that can easily pass a screw portion 1a of the motor shaft 1 therethrough is formed on the other piece side. The motor shaft 1 is rotatably positioned by a rear end bearing portion 12 (bearing portion on the left side of FIG. 2) which is integrally formed with a bobbin 10 and the distal end bearing portion 4 (bearing portion on the right side of FIG. 2) which is pressed into the motor holder 2. A thrust spring 5 suppresses any play of the motor shaft 1 along the thrust direction and applies an appropriate pilot pressure to the motor shaft 1. A cylindrical magnet rotor 6 is fixed to the motor shaft 1 by bonding, and the outer surface of the magnet rotor 6 is magnetized to have multiple poles. A stator 7 comprises two electromagnets each of which has pole teeth corresponding to the number of poles of the magnet rotor 6 and is constituted by coils 11 as solenoids wound on the bobbin 10 to form a magnetic path together with a motor case 9 which is coupled to the motor holder with screws 8. The pole teeth of the electromagnets are shifted by a ½ pitch. More specifically, when rectangular waves or sine waves that are 90° out of phase are supplied to the coils 11, the magnet rotor 6 rotates. A nut or rack (not shown) meshed with the screw portion 1a of the motor shaft 1 can be used to move a lens.

Figure 3:
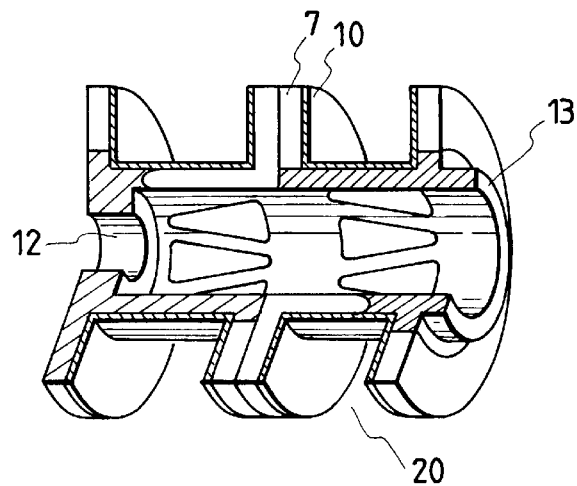
FIG. 3 is a perspective view of a resin material in which a bearing, a coil bobbin, and the positioning portion of a motor holder shown in FIG. 1 are integrally formed.

As shown in FIG. 3, the bobbin 10, the rear end bearing portion 12, and a cylindrical positioning portion 13 for positioning the motor holder 2 are integrally formed of a resin, thereby forming a resin material 20. The stator 7 is insert-molded in the resin material 20.

The assembly processes of the stepping motor having the above structure will be described below.

First, as shown in FIG. 2, the distal end bearing portion 4 is pressed into the first opening 2a of the motor holder 2, thereby preparing the motor holder 2 to which the distal end bearing portion 4 is fixed.

The thrust spring 5 is mounted in the motor case 9, and the resin material 20 is fitted in the motor case 9. The rear end of the motor shaft 1 is inserted in the motor case 9 in which the resin material 20 is fitted, and is set in the rear end bearing portion 12 of the resin material 20.

Figure 4:
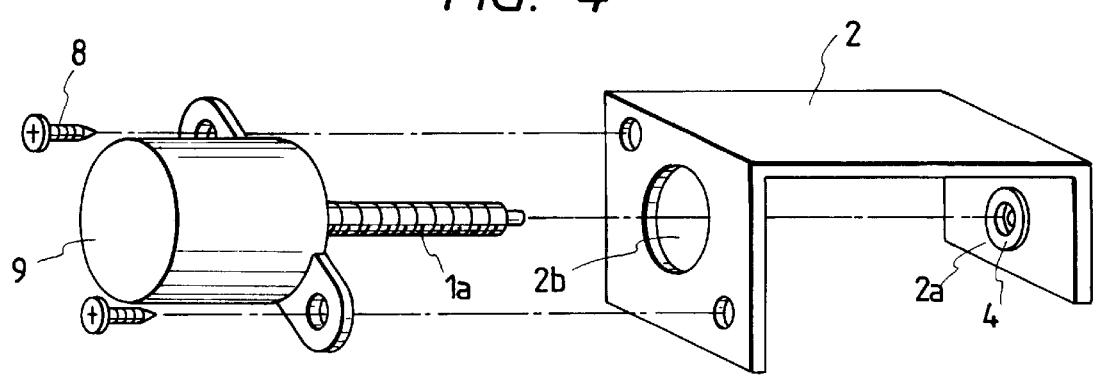
FIG. 4 is a perspective view showing a process of mounting a motor case having a motor shaft on a motor cover.

Next, as shown in FIG. 4, the motor case 9 is coupled to the motor holder 2. To do this, first, the screw portion 1a of the motor shaft 1 which is inserted in the motor case 9 is fed through the second opening 2b of the motor holder 2, so that the distal end of the screw portion 1a is set in the distal end bearing portion 4 of the motor holder 2. Almost simultaneously, the positioning portion 13 of the resin material 20 (FIG. 3) is fitted in the second opening 2b of the motor holder 2 to position the motor holder 2 by the resin material 20 fitted in the motor case 9. The motor case 9 and the motor holder 2 are coupled with the screws 8, thereby completing assembly of the motor.

Figure 6:
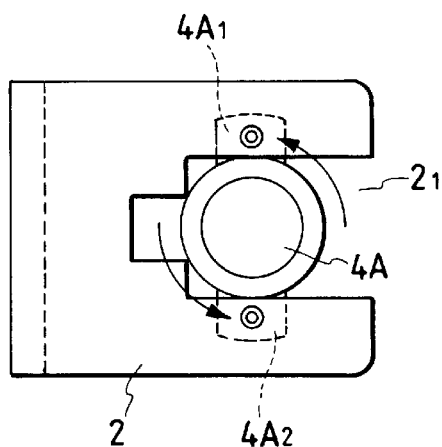
FIG. 6 is a view showing a distal end bearing portion at the distal end of a motor shaft shown in FIG. 1.
Figure 7:
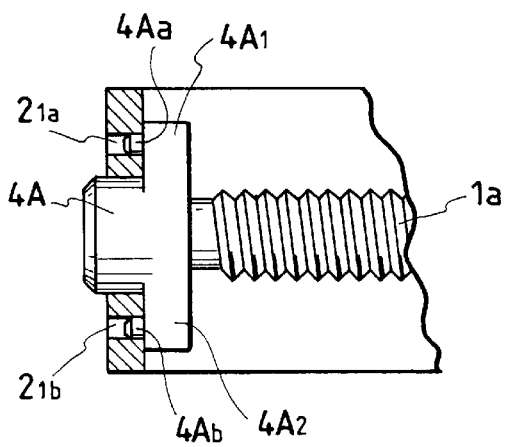
FIG. 7 is a sectional view of the distal end bearing portion shown in FIG. 6.

Another embodiment of the present invention will be described below with reference to FIGS. 5, 6 and 7. In the first embodiment, the motor shaft 1 is mounted in the motor case 9 before the motor case 9 is coupled to the motor holder 2. In the second embodiment, however, a motor shaft 1 is mounted after a motor case 9 is coupled to a motor holder 2.

Figure 5:
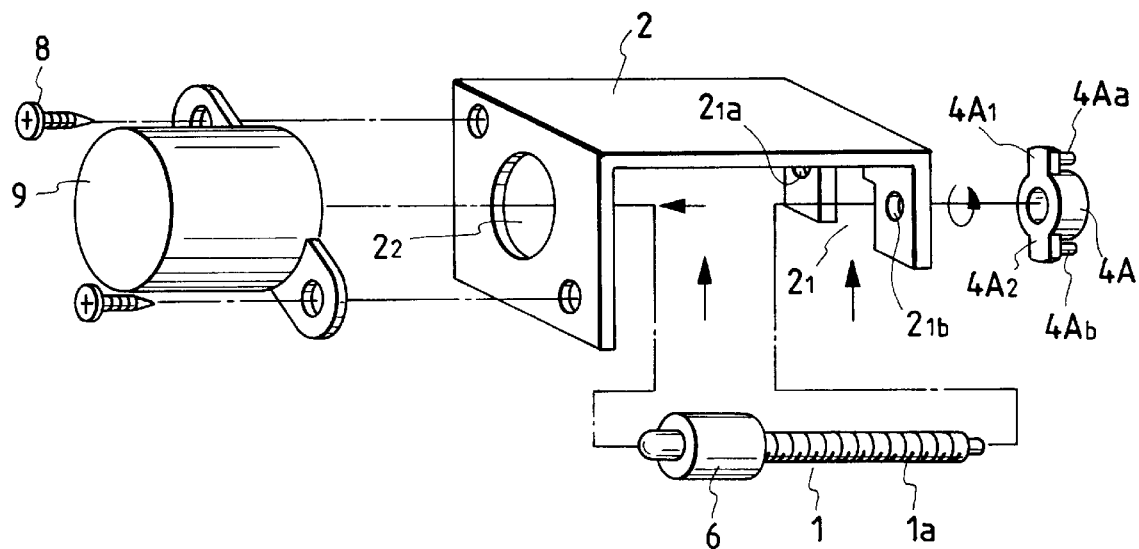
FIG. 5 is a perspective view showing a process of assembling a stepping motor according to another embodiment of the present invention.

In this embodiment, as shown in FIG. 5, a first opening $2_1$ for fixing a distal end bearing portion 4A is formed on one piece side of the opposite pieces of the motor holder 2. A second opening $2_2$ having a size that can pass a magnet rotor 6 of the motor shaft 1 therethrough is formed on the other piece side. Projecting pieces 4A1 and 4A2 projecting in opposite directions on a line are formed around the distal end bearing portion 4A. Projecting portions 4Aa and 4Ab to be fitted in two holes $2_{1a}$ and $2_{1b}$ formed on one piece side of the motor holder 2 are arranged on the projecting pieces 4A1 and 4A2, respectively. The first opening $2_1$ on one piece side of the motor holder 2 is formed as a notch such that the distal end bearing portion 4A with the projecting pieces 4A1 and 4A2 can enter/retreat in phase with the first opening $2_1$.

The assembly processes of the stepping motor of this second embodiment of the present invention will be described below.

A thrust spring 5, such as shown in FIG. 2, is mounted in the motor case 9, and a resin material 20 is fitted in the motor case 9.

A positioning portion 13 of the resin material 20 is fitted in the second opening $2_2$ of the motor holder 2 to position the motor holder 2 shown in FIG. 5 by the resin material 20 fitted in the motor case 9. The motor case 9 and the motor holder 2 are coupled with screws 8.

Thereafter, the magnet rotor 6 coupled to the motor shaft 1 is fed through the second opening $2_2$ of the motor holder 2, so that the rear end of the motor shaft 1 is set in a rear end bearing portion 12a. The projecting pieces 4A1 and 4A2 of the distal end bearing portion 4A are set in phase with the first opening $2_1$ on one piece side of the motor holder 2, so that the distal end of a screw portion 1a of the motor shaft 1 is set in the distal end bearing portion 4A. The motor shaft 1 is pressed to the motor case 9 side together with the distal end bearing portion 4A. The distal end bearing portion 4A is pivoted in a direction indicated by arrows in FIG. 6. The projecting portions 4Aa and 4Ab of the projecting pieces 4A1 and 4A2 of the distal end bearing portion 4A are fitted in the two holes $2_{1a}$ and $2_{1b}$ on one piece side of the motor holder 2, as shown in FIG. 7, thereby completing assembly of the motor. At this time, the distal end bearing portion 4A is always biased by the motor shaft 1 because of the pilot pressure of the thrust spring 5.

As has been described above, according to the present invention, in the stepping motor in which the respective bearings are disposed at two end portions of the motor shaft which is coaxially fixed to the magnet rotor, one bearing of the motor shaft arranged in the motor case, the bobbin serving as a coil frame, and the positioning portion of the motor holder are integrally formed of a resin. With this structure, the motor holder and the motor shaft center can be easily and accurately positioned in assembly, and the number of parts can be reduced. Therefore, an inexpensive stepping motor can be obtained.

The bearing support portion arranged on the motor holder side of the stepping motor has two openings and a bearing positioning rotation regulating hole. One of the two openings of the bearing support portion has a size that can pass the motor shaft therethrough. The motor shaft to which the magnet rotor is fixed is mounted after the motor holder and the motor case unit (the thrust spring, the stator, the bobbins, and the coils are mounted in the motor case) are coupled. With this structure, an easy assembly method can be obtained.

What is claimed is:

1. A stepping motor comprising:

a magnet rotor;

a motor shaft coupled to said magnet rotor;

a first bearing for receiving one end of said motor shaft;

a second bearing for receiving the other end of said motor shaft;

a motor case for accommodating said magnet rotor coupled to said motor shaft and said first bearing;

a motor holder to which said second bearing is fixed, said motor holder being coupled to said motor case;

a stator arranged around said magnet rotor in said motor case;

a coil for exciting said stator in said motor case; and a bobbin on which said coil is wound, said bobbin being materially integrally formed with said first bearing and a positioning portion, said positioning portion being fitted to position said motor holder said motor holder, said bobbin being integrally formed with said stator and said stator being inserted therein.

2. A motor according to claim 1, wherein said motor holder is formed to have opposite pieces such that said second bearing is fixed on one piece side, and an opening portion having a size that can pass a screw portion of said motor shaft therethrough is formed on the other piece side.

3. A motor according to claim 2, wherein said positioning portion of said bobbin is fitted in the opening portion of said motor holder to position said motor holder, and said motor case and said motor holder are coupled with a coupling member.

4. A stepping motor comprising:

a magnet rotor;

a motor shaft coupled to said magnet rotor;

a rear end bearing for receiving a rear end of said motor shaft;

a distal end bearing for receiving a distal end of said motor shaft;

a motor case for accommodating said magnet rotor coupled to said motor shaft and said rear end bearing;

a motor holder coupled to said motor case and formed to have opposite pieces such that a first opening to which said distal end bearing is attached is formed on one piece side, and a second opening having a size that can pass said magnet rotor coupled to said motor shaft therethrough is formed on the other piece side;

a stator arranged around said magnet rotor in said motor case;

a coil for exciting said stator in said motor case; and a bobbin on which said coil is wound, said bobbin being materially integrally formed of a resin with said rear end bearing and a positioning portion, said positioning portion being fitted to position said motor holder said motor holder, said bobbin having said stator inserted therein.

\* \* \* \* \*

UNITED STATES PATENT AND TRADEMARK OFFICE
CERTIFICATE OF CORRECTION

PATENT : 5,886,438
DATED : March 23, 1999
INVENTOR(S) : TOSHIAKI KAWANISHI

It is certified that error appears in the above-identified patent and that said Letters Patent is hereby corrected as shown below:

<u>COLUMN 4</u>

```
    Line 30, "holder said motor holder," should read
            --holder,--" and
    Line 63, "said motor holder said" should read --said--.
```

Signed and Sealed this

Twenty-third Day of November, 1999

Attest:

Q. TODD DICKINSON

*Attesting Officer*    *Acting Commissioner of Patents and Trademarks*